US011919351B2

United States Patent
Park et al.

(10) Patent No.: US 11,919,351 B2
(45) Date of Patent: Mar. 5, 2024

(54) APPARATUS AND METHOD FOR CONTROLLING VEHICLE HEIGHT

(71) Applicants: HYUNDAI MOTOR COMPANY, Seoul (KR); KIA MOTORS CORPORATION, Seoul (KR)

(72) Inventors: Jae Hyung Park, Seoul (KR); Woo Sung Lee, Seoul (KR); Eun Woo Na, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 533 days.

(21) Appl. No.: 17/018,218

(22) Filed: Sep. 11, 2020

(65) Prior Publication Data
US 2021/0387496 A1 Dec. 16, 2021

(30) Foreign Application Priority Data
Jun. 16, 2020 (KR) ........................ 10-2020-0073108

(51) Int. Cl.
*B60G 17/0165* (2006.01)

(52) U.S. Cl.
CPC .... *B60G 17/0165* (2013.01); *B60G 2400/252* (2013.01); *B60G 2400/50* (2013.01); *B60G 2400/823* (2013.01)

(58) Field of Classification Search
CPC .......... B60G 2400/823; B60G 2500/30; B60G 2800/914
See application file for complete search history.

(56) References Cited

U.S. PATENT DOCUMENTS

| | | | |
|---|---|---|---|
| 8,989,963 B1* | 3/2015 | Yellambalase | B60G 17/052 280/5.514 |
| 10,744,840 B2* | 8/2020 | Tanaka | B60G 17/017 |
| 2009/0069993 A1* | 3/2009 | Inoue | B60W 40/06 701/70 |
| 2015/0105977 A1* | 4/2015 | Lee | B60G 17/0185 701/37 |
| 2017/0349023 A1* | 12/2017 | Mori | B60G 17/0195 |
| 2021/0237827 A1* | 8/2021 | Tomura | G08G 1/166 |

* cited by examiner

*Primary Examiner* — Anshul Sood
(74) *Attorney, Agent, or Firm* — MORGAN, LEWIS & BOCKIUS LLP

(57) ABSTRACT

A vehicle height control apparatus includes an information acquisition device that acquires pressure data on a pressure inside an air tank storing compressed air and obstacle data on an obstacle in front of a vehicle, and a controller that calculates a target vehicle height based on the obstacle data, calculates a required distance required to reach the target vehicle height based on the pressure of the compressed air inside the air tank, and determines a vehicle height control timing, resolving a problem that the vehicle height is unnecessarily quickly controlled compared to the position of the obstacle, or is controlled after the vehicle passes through the obstacle to reduce the ride comfort.

12 Claims, 5 Drawing Sheets

APPARATUS AND METHOD FOR CONTROLLING VEHICLE HEIGHT

CROSS-REFERENCE TO RELATED APPLICATION

The present application claims the benefit of priority to Korean Patent Application No. 10-2020-0073108, filed on Jun. 16, 2020 in the Korean Intellectual Property Office, the entire contents of which are incorporated herein by reference.

TECHNICAL FIELD

The present disclosure relates to an apparatus and method for controlling vehicle height.

BACKGROUND

To improve ride comfort of a user riding in a vehicle, the role of a suspension that capable of supporting stable and comfortable driving regardless of the road surface condition is emerging. In general, the suspension relieves vibration or shock transmitted from the road surface using a spring when a vehicle is driving. In recent years, there is an increasing tendency to mount an air suspension, which has improved performance compared to an existing suspension.

The air suspension adjusts a vehicle height (vehicle body height) by using compressed air stored in an air tank, which causes a vehicle height control speed to vary depending on a pressure of the air remaining in the air tank and accordingly, the vehicle height is controlled later or faster than a time point at which the vehicle height needs to be controlled, deteriorating the ride comfort.

The information disclosed in the Background section above is to aid in the understanding of the background of the present disclosure, and should not be taken as acknowledgement that this information forms any part of prior art.

SUMMARY

The present disclosure has been made to solve the above-mentioned problems occurring in the prior art while advantages achieved by the prior art are maintained intact.

An aspect of the present disclosure provides a vehicle height control apparatus and method for determining vehicle height control timing in consideration of an air pressure inside an air tank.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle height control apparatus includes an information acquisition device that acquires pressure data on a pressure inside an air tank storing compressed air and obstacle data on an obstacle in front of a vehicle, and a controller that calculates a target vehicle height based on the obstacle data, calculates a required distance required to reach the target vehicle height based on the pressure of the compressed air inside the air tank, and determines a vehicle height control timing.

The obstacle data may include a height of the obstacle and a distance from the vehicle to the obstacle.

The controller may set a required time to reach the target vehicle height based on the pressure of the compressed air and calculate the required distance using the required time and a current vehicle speed of the vehicle.

The controller may calculate a difference value between the distance from the vehicle to the obstacle and the required distance and determine whether the difference value is less than or equal to a threshold distance.

The controller may determine the time point at which the difference value is less than or equal to the threshold distance as the vehicle height control timing and control the vehicle height to reach the target vehicle height at the vehicle height control timing.

The controller may reset the required time when the difference value is not less than or equal to the threshold distance.

According to another aspect of the present disclosure, a vehicle height control apparatus includes an information acquisition device that acquires pressure data on a pressure inside an air tank storing compressed air and obstacle data on an obstacle in front of a vehicle and a controller that calculates a target vehicle height based on the obstacle data, sets a required time required to reach the target vehicle height based on the pressure of the compressed air inside the air tank, and determines vehicle height control timing.

The obstacle data may include a height of the obstacle and an arrival time required to arrive at the obstacle from the vehicle.

The controller may calculate a difference value between the arrival time required to arrive at the obstacle from the vehicle and the required time required to reach the target vehicle height and determine a time point at which the difference value is less than or equal to a threshold time.

The controller may determine the time point at which the difference value is less than or equal to the threshold time as the vehicle height control timing and control the vehicle height to reach the target vehicle height at the vehicle height control timing.

According to an aspect of the present disclosure, a vehicle height control method includes acquiring pressure data on a pressure inside an air tank storing compressed air and obstacle data on an obstacle in front of a vehicle, calculating a target vehicle height based on the obstacle data, and calculating a required distance required to reach the target vehicle height based on the pressure of the compressed air inside the air tank, and determining vehicle height control timing.

The obstacle data may include a height of the obstacle and a distance from the vehicle to the obstacle.

The calculating of the required distance may include setting a required time to reach the target vehicle height based on the pressure of the compressed air and calculating the required distance using the required time and a current vehicle speed of the vehicle.

The vehicle height control method may further include calculating a difference value between a distance from the vehicle to the obstacle and the required distance and determining whether the difference value is less than or equal to a threshold distance.

The determining of the vehicle height control timing may include determining a time point at which the difference value is less than or equal to the threshold distance as the vehicle height control timing.

The vehicle height control method may further include controlling the vehicle height to reach the target vehicle height at the vehicle height control timing.

According to another aspect of the present disclosure, a vehicle height control method includes acquiring pressure data on a pressure inside an air tank storing compressed air and obstacle data on an obstacle in front of a vehicle, and calculating a target vehicle height based on the obstacle data, setting a required time required to reach the target vehicle height based on the pressure of the compressed air inside the air tank, and determining vehicle height control timing.

The obstacle data may include a height of the obstacle and an arrival time required to arrive at the obstacle from the vehicle.

The vehicle height control method may further include calculating a difference value between the arrival time required to arrive at the obstacle from the vehicle and the required time required to reach the target vehicle height and determining a time point at which the difference value is less than or equal to a threshold time.

The vehicle height control method may further include determining the time point at which the difference value is less than or equal to the threshold time as the vehicle height control timing and controlling the vehicle height to reach the target vehicle height at the vehicle height control timing.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
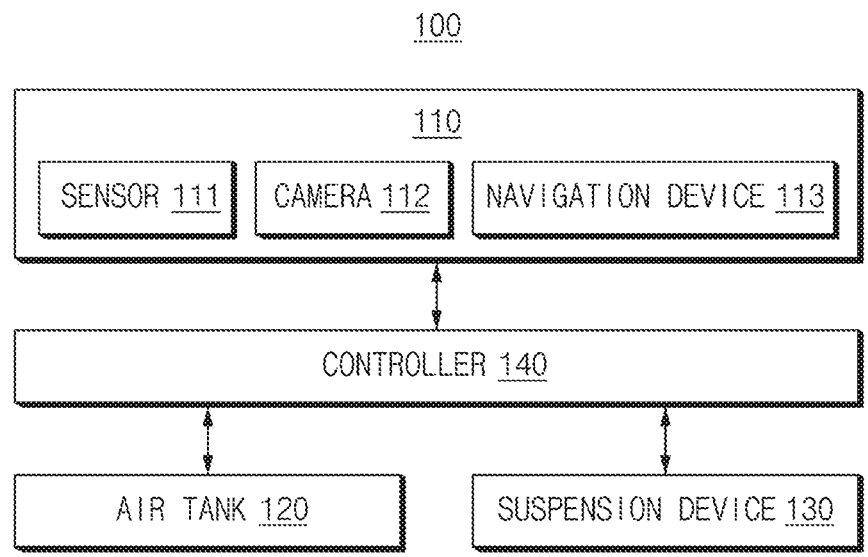
FIG. 1 is a configuration diagram showing a configuration of a vehicle height control apparatus according to an exemplary embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a configuration diagram showing a configuration of a vehicle height control device according to an exemplary embodiment of the present disclosure.

Referring to FIG. 1, a vehicle height control device 100 according to an exemplary embodiment of the present disclosure may include an information acquisition device 110, an air tank 120, a suspension device 130 and a controller 140.

The information acquisition device 110 may acquire pressure data on a pressure inside the air tank 120 in which compressed air is stored and obstacle data on an obstacle in front of a vehicle. Here, an obstacle may include a speed bump, and the obstacle data may include the height of the obstacle, an arrival time required to arrive at the obstacle from the vehicle, and a distance from the vehicle to the obstacle. To acquire the obstacle data, the information acquisition device 110 may include a sensor 111, a camera 112 and a navigation device 113.

The sensor 111 may include a distance sensor that detects a vehicle or an obstacle in front of the vehicle, and measures a height of the obstacle and a distance from the vehicle to the obstacle. Here, the distance sensor may include a radar or a Light detection and ranging (LIDAR), but may be implemented with the Lidar for precise measurement. In addition, the sensor 111 may measure the height of the obstacle. Furthermore, the sensor 111 may include a pressure sensor that measures an air pressure inside the air tank 120.

The camera 112 may acquire an image in front of the vehicle and detect an obstacle. According to an exemplary embodiment, when the camera 112 is implemented with a stereo camera, a distance from the vehicle to the obstacle may be detected by using a disparity difference detected from a stereo image. In addition, when the camera 112 is implemented with a time of flight (TOF) camera including a light source (infrared or laser) and a receiver, the camera 112 may calculate an arrival time required to arrive at an obstacle from the light source (vehicle) and a distance between the light source (vehicle) and the obstacle, based on a time (TOF) for infrared light or lasers emitted from the light source (vehicle) to be reflected by the obstacle and received.

The navigation device 113 may include a display that displays road information on a road on which the vehicle is driving. According to an exemplary embodiment, the navigation device 113 may display road information including obstacle information on an obstacle within a predetermined distance from the vehicle.

The air tank 120 may store compressed air which had compressed by a compressor separately provided, and the compressed air may be used to control a vehicle height by moving to the suspension device 130 under the control of the controller 140.

The suspension device 130 may be a device that fixes wheels to a shaft of the vehicle and relieves shock and vibration from the road surface, and may protect a vehicle body by raising the vehicle height on a road with an obstacle on the road surface and lowering the vehicle height and reducing air resistance on a road capable of high-speed driving such as a highway, increasing driving stability under the control of the controller 140.

According to an exemplary embodiment of the present disclosure, the controller 140 is implemented by various processing devices, such as a microprocessor, CPU, ASIC, circuitry, logic circuits, etc., incorporating a semiconductor chip capable of operating or executing various instructions or the like and may control an operation of the vehicle height control apparatus. Specifically, a target vehicle height may be calculated based on the obstacle data, a required distance required to reach the target vehicle height may be calculated based on the pressure of the compressed air inside the air tank 120, and vehicle height control timing may be determined based on the obstacle data and the required distance.

The controller 140 may calculate the target vehicle height based on the height of the obstacle and the distance from the vehicle to the obstacle, which are acquired from the information acquisition device 110. When the target vehicle height is calculated, the controller 140 may set a required time to reach the target vehicle height based on the pressure of the compressed air stored in the air tank 120. According to an exemplary embodiment, the controller 140 may set the required time with reference to FIG. 2.

Figure 2:
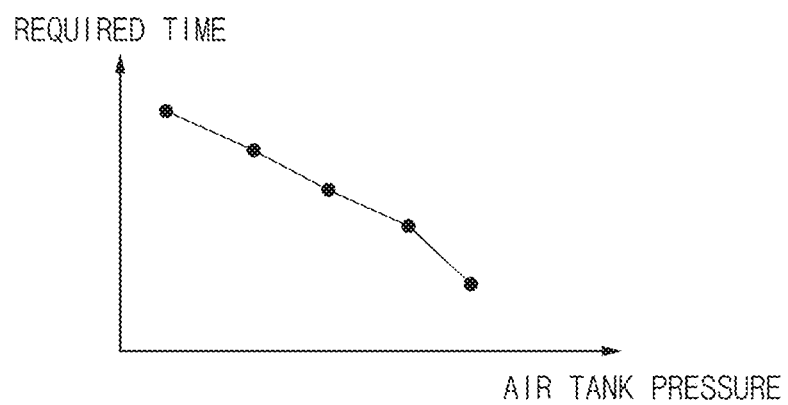
FIG. 2 is a graph showing a reach time required to reach a vehicle height according to a pressure of an air tank according to an exemplary embodiment of the present disclosure.

FIG. 2 is a graph showing required times according to pressures of an air tank 120 according to an exemplary embodiment of the present disclosure.

Referring to FIG. 2, it can be seen that the higher the pressure of the air tank 120, the lower the time required to reach the vehicle height, and the lower the pressure of the air tank 120, the higher the time required to reach the vehicle height. Accordingly, the controller 140 may measure the pressure of the compressed air remaining currently in the air tank 120, and set the time required to reach the vehicle height corresponding to the pressure of the compressed air in the graph of FIG. 2 to a required time.

When the required time is set, the controller 140 may calculate a required distance to reach the target vehicle height based on the set required time and a current vehicle speed. Here, the required distance to reach the target height may be calculated using Equation 1.

Required distance=current vehicle speed*required time            <Equation 1>

When the required distance is calculated, the controller 140 may calculate a difference value between the required distance and the distance from the vehicle to the obstacle, and determine whether the calculated difference value is less than or equal to a threshold distance. A more detailed description will be given with reference to FIG. 3.

Figure 3:
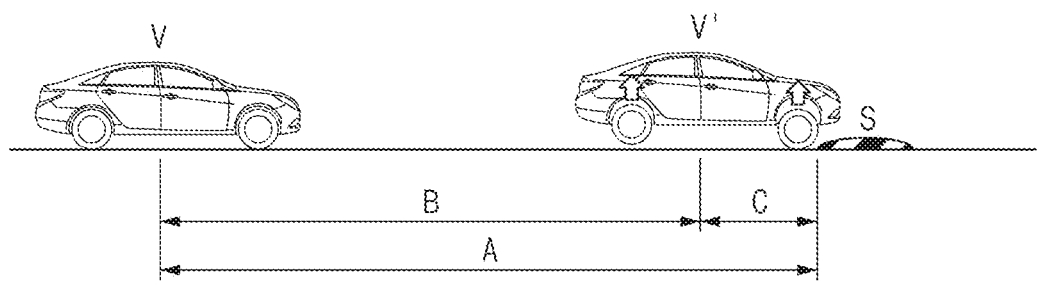
FIG. 3 is a view schematically showing vehicle height control timing according to an exemplary embodiment of the present disclosure.

FIG. 3 is a view schematically showing vehicle height control timing according to an exemplary embodiment of the present disclosure.

Referring to FIG. 3, the controller 140 may acquire a distance A to an obstacle S in front of a vehicle V, from the information acquisition device 110. In addition, the controller 140 may calculate a required distance B which the vehicle has traveled for a time required to reach a target vehicle height. The controller 140 may calculate a difference value C in the required distance B from the distance A to the obstacle S, and determine whether the difference value C is less than or equal to a threshold distance. Here, the threshold distance may mean a distance which the vehicle is able to pass through the obstacle S within a predetermined time from the vehicle position V' at the time when the target vehicle height is reached.

When it is determined that the difference value C is less than or equal to the threshold distance, the controller 140 may determine that the vehicle is able to pass through the obstacle S within the predetermined time from the vehicle position V' at the time when the vehicle reaches the target vehicle height, control the suspension device 130 after at the time when the difference value C is less than or equal to the threshold distance, such that the vehicle height reaches the target vehicle height. Accordingly, the controller 140 may control the vehicle height to reach the target vehicle height corresponding to the position of the obstacle S, maximizing the ride comfort of the user.

However, when it is determined that the difference value C exceeds the threshold distance, the controller 140 may determine that the vehicle is able to pass through the obstacle S after exceeding the predetermined time from the vehicle position V' at the time when the vehicle reaches the target vehicle height and determine that control is unnecessarily quickly performed because the vehicle height is not controlled corresponding to the position of the obstacle S. Accordingly, when it is determined that the difference value C exceeds the threshold distance, the controller 140 may reset the required time without controlling the suspension device 130.

According to another exemplary embodiment of the present disclosure, the controller 140 may calculate a difference value between an arrival time required to arrive at the obstacle from the vehicle and a required time required to reach a target vehicle height, and determine when the difference value is less than or equal to a threshold time. In addition, the controller 140 may determine a time point at which the difference value is equal to or less than a threshold time as vehicle height control timing and control the vehicle height at the vehicle height control timing. When it is determined that the difference value between the arrival time and the required time exceeds the threshold time, the controller 140 may determine that the vehicle height control is controlled unnecessarily quickly compared to the position of the obstacle.

Figure 4:
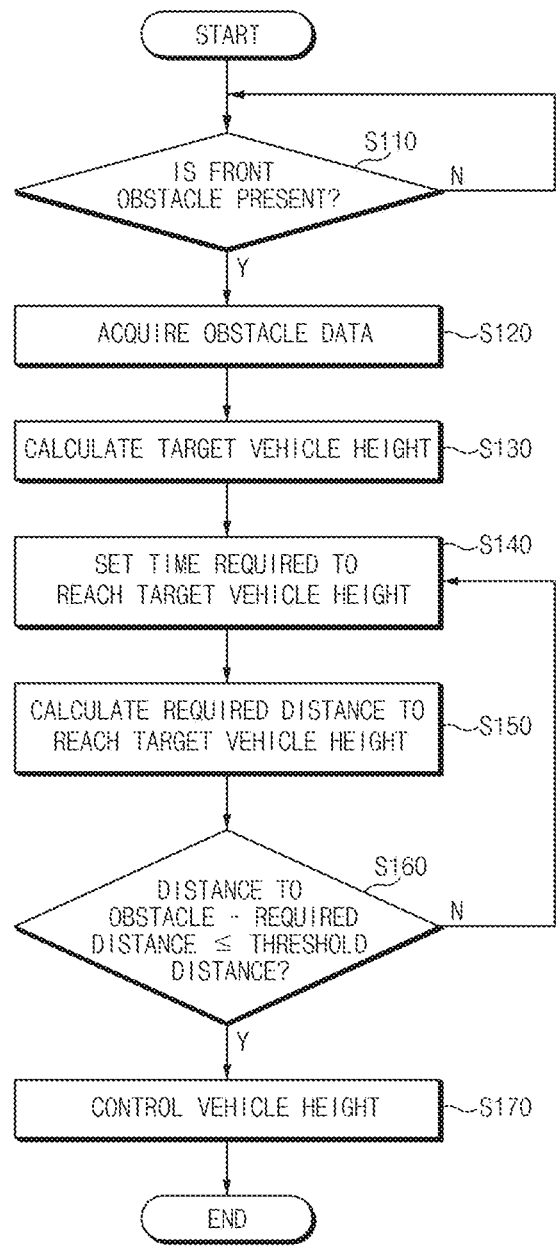
FIG. 4 is a flowchart of a vehicle height control method according to an exemplary embodiment of the present disclosure.

FIG. 4 is a flowchart of a vehicle height control method according to an exemplary embodiment of the present disclosure.

Referring to FIG. 4, the controller 140 may determine whether an obstacle is present in front of the vehicle (S110). When it is determined that an obstacle exists in front of the vehicle "Y", the controller 140 may obtain obstacle data (S120). In S120, the controller 140 may acquire obstacle data including the height of the obstacle, the arrival time required to arrive at the obstacle from the vehicle, and the distance from the vehicle to the obstacle from the information acquisition device 110.

The controller 140 may calculate the target vehicle height based on the obstacle data acquired in S120 (S130). When the target vehicle height is calculated, the controller may set a required time to reach the target vehicle height based on the pressure of compressed air stored in the air tank 120 (S140). According to an exemplary embodiment, the controller 140 may set the required time with reference to FIG. 2. For a detailed description of the operation of S140, the description with reference to FIG. 2 may be referred to.

When the required time is set, the controller 140 may calculate a required distance to reach the target vehicle height based on the required time and a current vehicle speed (S150). The required distance to reach the target vehicle height in S150 may be calculated using Equation 1. According to another exemplary embodiment of the present disclosure, in S150, the controller 140 may calculate an arrival time required to arrive at the obstacle from the vehicle.

When the required distance is calculated, the controller 140 may calculate a difference value between the required distance and a distance to the obstacle, and determine whether the calculated difference value is less than or equal to a threshold distance (S160). For a detailed description of the operation of S160, the description with reference to FIG. 3 may be referred to. According to another exemplary embodiment of the present disclosure, in S160, the controller 140 may calculate a difference value between an arrival time required to arrive at the obstacle from the vehicle and a required time required to reach a target vehicle height, and determine whether the difference value is less than or equal to a threshold time.

When it is determined in S160 that the difference value C is less than or equal to the threshold time (Y), the controller 140 may determine that the vehicle is able to pass through the obstacle S within a predetermined time from a vehicle position V' at the time when the vehicle reaches the target vehicle height and control the suspension device 130 from the time when the difference value C is less than or equal to the threshold value to perform control such that the vehicle height reaches the target vehicle height (S170). According to another exemplary embodiment of the present disclosure, when it is determined in S160 that a difference value between an arrival time required to arrive at the obstacle from the vehicle and a required time required to reach a target vehicle height is less than or equal to the threshold time, the controller 140 may control the suspension device 130 after the time when the difference value is less than or equal to the threshold time and perform control such that the vehicle height reaches the target vehicle height. (S170).

On the other hand, in step S160, when it is determined that the difference value C exceeds the threshold distance (N), the controller 140 may determine that the vehicle is able to pass through the obstacle S after exceeding the predetermined time from the vehicle position V' at the time when the vehicle reaches the target vehicle height and determine that control is unnecessarily quickly performed because the vehicle height is not controlled corresponding to the position of the obstacle S. According to another exemplary embodiment of the present disclosure, when it is determined in S160 that the difference value between the arrival time and the required time exceeds the threshold time, the controller 140 may determine that the vehicle height is controlled unnecessarily quickly compared to a position of the obstacle. Accordingly, when it is determined that the difference value C exceeds the threshold distance, the controller 140 may reset the required time without controlling the suspension device 130 (S140).

Figure 5:
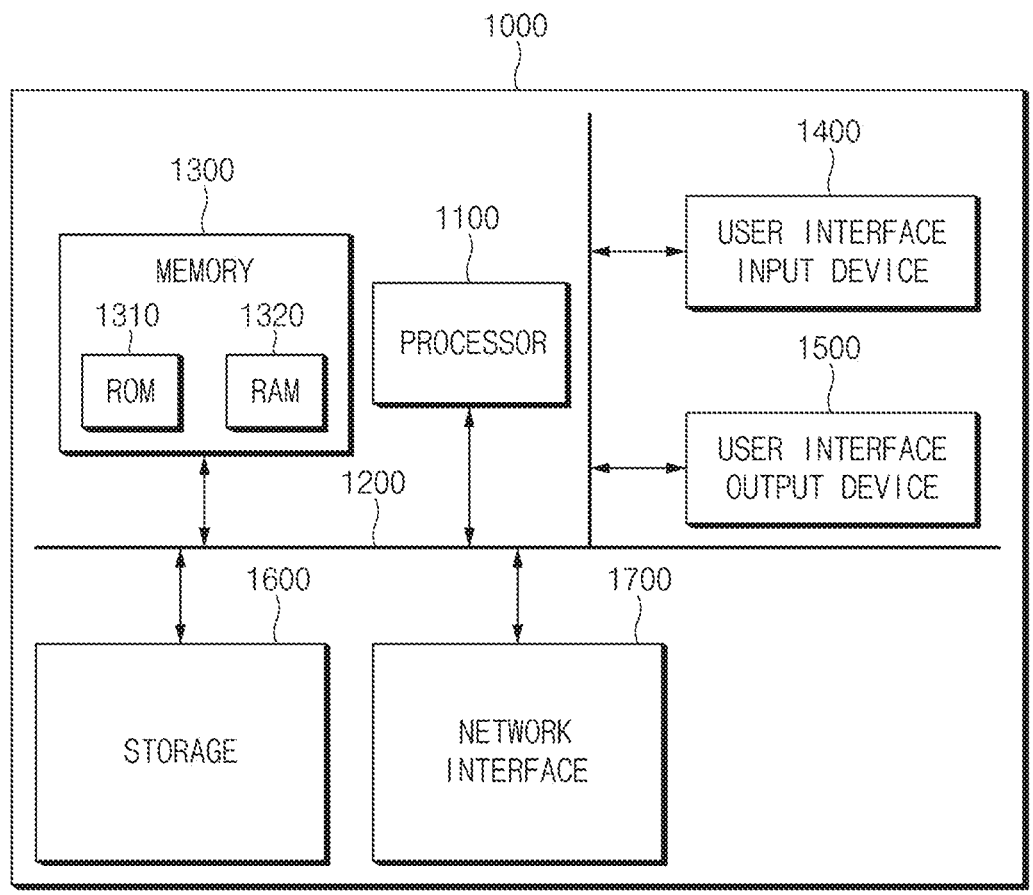
FIG. 5 illustrates a configuration of a computing system for executing a method according to an exemplary embodiment of the present disclosure.

FIG. 5 illustrates a configuration of a computing system for executing a method according to an exemplary embodiment of the present disclosure.

Referring to FIG. 5, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains.

Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be interpreted by the following claims, and all technical ideas within the scope equivalent thereto should be construed as being included in the scope of the present disclosure.

The vehicle height control apparatus and method according to an exemplary embodiment of the present disclosure may determine vehicle height control timing in consideration of the air pressure inside the air tank, thus resolving a problem that the vehicle height is unnecessarily quickly controlled compared to the position of the obstacle, or is controlled after the vehicle passes through the obstacle to reduce the ride comfort.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle height control apparatus comprising:
   an information acquisition device configured to acquire pressure data on a pressure inside an air tank storing compressed air and obstacle data on an obstacle in front of a vehicle; and
   a controller configured to calculate a target vehicle height based on the obstacle data, to calculate a required forward-moving distance required for controlling a vehicle height to reach the target vehicle height based on the pressure of the compressed air inside the air tank, and to determine a vehicle height control timing and control the vehicle height at the vehicle height control timing,
   wherein the obstacle data includes a height of the obstacle and a distance from the vehicle to the obstacle, and
   wherein the controller is further configured to set a required time to reach the target vehicle height based on the pressure of the compressed air, to calculate the required forward-moving distance using the required time and a current vehicle speed of the vehicle, to calculate a difference value between the distance from the vehicle to the obstacle and the required forward-moving distance, and to determine a time point at which the difference value is less than or equal to a threshold distance as the vehicle height control timing.

2. The vehicle height control apparatus of claim 1, wherein the controller is further configured to reset the required time when the difference value is not less than or equal to the threshold distance.

3. The vehicle height control apparatus of claim 1, wherein the controller controls the vehicle height at the vehicle height control timing such that a time point at which the vehicle height reaches the target vehicle height substantially matches a time point at which the vehicle reaches the obstacle.

4. A vehicle height control apparatus comprising:
an information acquisition device configured to acquire pressure data on a pressure inside an air tank storing compressed air and obstacle data on an obstacle in front of a vehicle; and
a controller configured to calculate a target vehicle height based on the obstacle data, to set a required time required for controlling a vehicle height to reach the target vehicle height based on the pressure of the compressed air inside the air tank, and to determine a vehicle height control timing and control the vehicle height at the vehicle height control timing,
wherein the obstacle data includes a height of the obstacle and an arrival time required to arrive at the obstacle from the vehicle, and
wherein the controller is further configured to calculate a difference value between the arrival time and the required time and to determine a time point at which the difference value is less than or equal to a threshold time as the vehicle height control timing.

5. The vehicle height control apparatus of claim 4, wherein the controller controls the vehicle height at the vehicle height control timing such that a time point at which the vehicle height reaches the target vehicle height substantially matches a time point at which the vehicle reaches the obstacle.

6. The vehicle height control apparatus of claim 4, wherein the controller is further configured to reset the required time when the difference value is not less than or equal to the threshold time.

7. A vehicle height control method comprising:
acquiring pressure data on a pressure inside an air tank storing compressed air and obstacle data on an obstacle in front of a vehicle;
calculating a target vehicle height based on the obstacle data; and
calculating a required forward-moving distance required for controlling a vehicle height to reach the target vehicle height based on the pressure of the compressed air inside the air tank, determining a vehicle height control timing, and controlling the vehicle height at the vehicle height control timing,
wherein the obstacle data includes a height of the obstacle and a distance from the vehicle to the obstacle, and
the determining a vehicle height control timing includes:
setting a required time to reach the target vehicle height based on the pressure of the compressed air and calculating the required forward-moving distance using the required time and a current vehicle speed of the vehicle;
calculating a difference value between the distance from the vehicle to the obstacle and the required forward-moving distance; and
determining a time point at which the difference value is less than or equal to a threshold distance as the vehicle height control timing.

8. The vehicle height control method of claim 7, wherein the controlling the vehicle height includes controlling the vehicle height at the vehicle height control timing such that a time point at which the vehicle height reaches the target vehicle height substantially matches a time point at which the vehicle reaches the obstacle.

9. The vehicle height control method of claim 7, further comprising resetting the required time when the difference value is not less than or equal to the threshold distance.

10. A vehicle height control method comprising:
acquiring pressure data on a pressure inside an air tank storing compressed air and obstacle data on an obstacle in front of a vehicle; and
calculating a target vehicle height based on the obstacle data, setting a required time required for controlling a vehicle height to reach the target vehicle height based on the pressure of the compressed air inside the air tank, determining a vehicle height control timing, and controlling the vehicle height at the vehicle height control timing,
wherein the obstacle data includes a height of the obstacle and an arrival time required to arrive at the obstacle from the vehicle, and
the determining a vehicle height control timing includes:
calculating a difference value between the arrival time and the required time; and
determining a time point at which the difference value is less than or equal to a threshold time as the vehicle height control timing.

11. The vehicle height control method of claim 10, wherein the controlling the vehicle height includes controlling the vehicle height at the vehicle height control timing such that a time point at which the vehicle height reaches the target vehicle height substantially matches a time point at which the vehicle reaches the obstacle.

12. The vehicle height control method of claim 10, further comprising resetting the required time when the difference value is not less than or equal to the threshold time.

* * * * *